Sept. 29, 1959  E. C. CARLSON  2,906,061
BOUQUET HOLDER
Filed Dec. 6, 1957
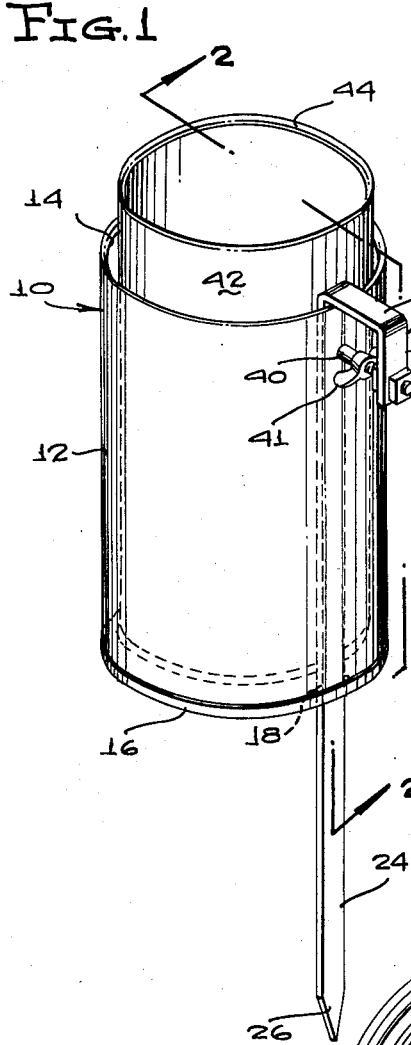
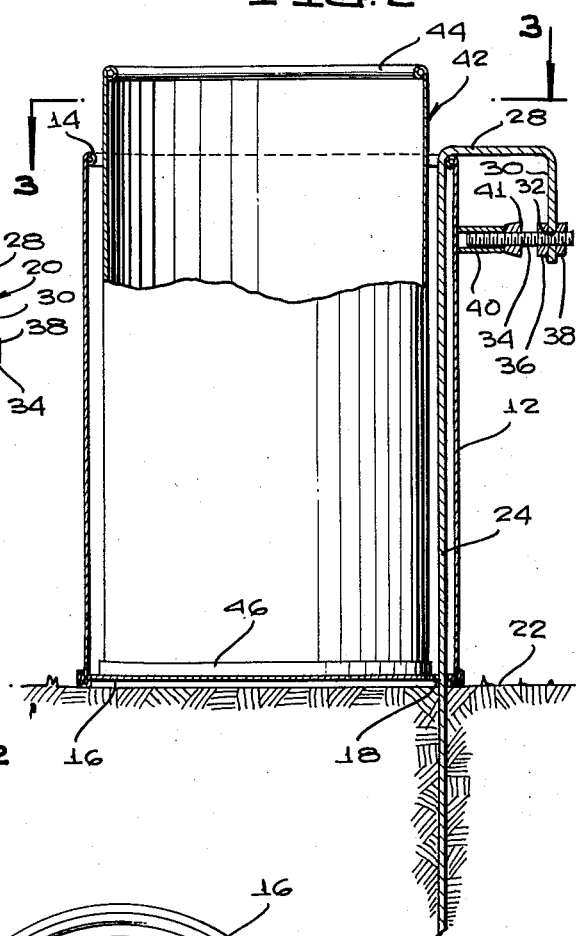
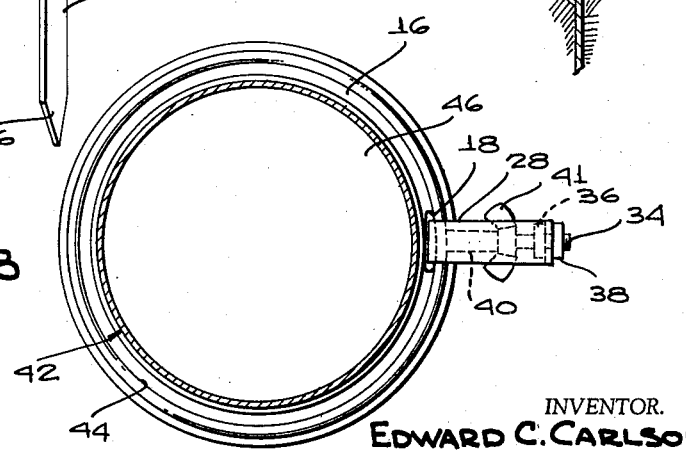
INVENTOR.
EDWARD C. CARLSON
BY
McMorrow, Berman & Davidson
ATTORNEYS 2,906,061
Patented Sept. 29, 1959

2,906,061

BOUQUET HOLDER

Edward C. Carlson, Wheaton, Minn.

Application December 6, 1957, Serial No. 701,028

2 Claims. (Cl. 47—41)

This invention relates to bouquet or flower pot holders and, more specifically, to the provision of a bouquet or flower pot holder for use on lawns in cemeteries, and on other outdoor sites.

One of the primary objects of this invention is to provide a device of the type described which when placed on the ground cannot be inadvertently or accidentally upset or blown over.

Another object of this invention is to provide a bouquet or flower pot holder with ground engaging support means to maintain the holder in a substantially upright or vertical position, the support means being easily insertable and removable from the ground.

A further object of this invention is to provide ground engaging support means for a flower pot or bouquet holder or vase as described above, the support means being detachably connected with the holder.

This invention contemplates, as a still further object thereof, the provision of a bouquet or flower pot holder which is non-complex in construction and assembly, inexpensive to manufacture, and durable in use.

Other and further objects and advantages of the present invention will become more evident from a consideration of the following specification when read in conjunction with the annexed drawing, in which:

Figure 1 is a perspective view of a bouquet or flower pot holder constructed in accordance with the present invention;

Figure 2 is a vertical detail cross-sectional view taken substantially on the line 2—2 of Figure 1, looking in the direction of the arrows; and, Figure 3 is a top plan view partly in cross section taken on the horizontal plane of line 3—3 of Figure 2, looking in the direction of the arrows.

Referring now more specifically to the drawing, reference numeral 10 designates, in general, a bouquet or flower pot holder constructed in accordance with the teachings of the instant invention. As is seen in the figures, the holder 10 comprises a substantially hollow cylindrical member 12 having an internally beaded open end 14 and an oppositely disposed end closed by a closure element 16. To serve a purpose to be described, the closure element 16 is formed with an elongated substantially rectangular slot 18 adjacent the circumferential marginal edge thereof.

Reference numeral 20 generally denotes a support device for maintaining the cylindrical member substantially upright when placed on the ground 22. The support device 20 comprises an elongated substantially rectangular flat brace 24 having a pointed lower ground engaging end 26. The other end of the brace 24 terminates in a laterally projecting flange 28 disposed substantially perpendicular thereto. The outer end of the flange 28 is integrally connected with one end of the depending reverted flange 30 having an aperture 32 extending transversely therethrough adjacent the free end thereof.

One end of an elongated externally threaded bolt 34 extends through the opening 32 and is releasably secured to the free end of the reverted flange 30 by nuts 36, 38 which are threaded thereon and engage opposite sides of the flange 30. The other end of the bolt 34 extends inwardly, substantially perpendicular to the brace 24, terminating in spaced relation relative thereto, and loosely receiving thereover an elongated substantially hollow cylindrical sleeve 40. A wing nut 41 is threaded on the bolt 34 intermediate the sleeve 40 and the nut 36 to serve a function to be described.

As is seen in the figures, the brace 24 extends through the open end of the cylindrical member 12 with the pointed end 26 thereof passing through the slot 18 and projecting below the closure element 16. The upper end of the brace member 24 at its junction with the flange 28 overlaps the bead 14 and projects radially therefrom. In connecting the brace 24 with the cylindrical member 12, the wing nut 41 is backed off a sufficient distance on the bolt 34 to permit the sleeve 40 to slide inwardly on the latter so as to provide clearance between the outer end of the sleeve 40 and the adjacent side of the cylindrical member 12. Thereafter, the wing nut 41 is rotated in the opposite direction to engage the inner end of the sleeve 40 and to effect axial movement thereof so that the outer end of the sleeve 40 is forced into engagement with the adjacent portion of the cylindrical member 12.

With the complement elements of the cylindrical member 12 and of the brace 24 assembled in the manner described above, the lower end of the brace 24, including the pointed tip 26, is now thrust into the ground 22 to such a depth as to effect engagement of the closure member 16 therewith. Under these conditions, it is now manifest that the cylindrical member 12 will be maintained in its vertical upright position and cannot be inadvertently or accidentally upset or blown away.

An inner substantially hollow cylindrical receptacle is indicated at 42 and includes a beaded open upper end 44 and a lower end having a closure wall 46 extending thereacross.

The inner cylindrical receptacle 42 is adapted to receive cut or other flowers (not shown) after which the receptacle 42 is inserted within the cylindrical member 12 with the closure wall in juxtaposition with respect to and supported by the closure element 16. While not absolutely necessary in the practice of this invention, it is preferred that a concentric relationship exist between the receptacle 42 and the cylindrical member 12. It is obvious that if it be desired, the receptacle 42 may be first inserted within the cylindrical member 12 in the manner illustrated in Figures 1 and 2 of the drawings, after which the flowers may be placed within the former.

When it is desired to replace the flowers disposed within the receptacle 42, the same may be removed therefrom without disturbing the relationship between the receptacle 42 and the cylindrical member 12 or the flowers and the receptacle 42 may be removed together from within the cylindrical member 12. Furthermore, if desired, the flowers, receptacle 42 and cylindrical member 12 may be moved, as a unit, away from the ground 22 by the simple expedient of pulling upwardly upon the laterally projecting flange 28. This effects disengagement of the brace 24 and its pointed end 26 from the ground 22 and the unit may then be moved to another site.

In the event that the cylindrical member 12 becomes damaged, or if for some reason it becomes desirable to replace the same with another, the wing nut 41 is backed off a sufficient distance to permit the outer end of the sleeve 40 to become disengaged from and clear the cylindrical member 12, after which the brace 24 is pulled upwardly to effect the removal thereof from within the slot 18.

Having described and illustrated in detail one embodiment of this invention it is to be understood that the same is offered merely by way of example, and that this invention is to be limited only by the scope of the appended claims.

What is claimed is:

1. A bouquet holder comprising an elongated substantially hollow cylindrical member having a pair of opposed open and closed ends, said closed end having an elongated substantially rectangular slot formed therein and extending transversely therethrough adjacent the circumferential marginal edge thereof, an elongated substantially rectangular brace member disposed within said cylindrical member and extending in a direction substantially parallel to the longitudinal axis of said hollow member thereof, said brace member having a pair of opposed ends including a ground engaging end portion extending through said slot and projecting beyond said closed end, means releasably connecting said brace to said cylindrical member, said last named means comprising a flange projecting laterally from the other end of said brace, said flange overlying said open end of said cylindrical member and having a reverted flange extending from the outer end thereof, said reverted flange being disposed in spaced, parallel and confronting relation relative to said brace, said reverted flange having an aperture formed therein adjacent the free end thereof, a bolt having one end thereof extending through said aperture, a pair of nuts threaded on said one end of said bolt and engaging said reverted flange on opposite sides thereof to releasably clamp said reverted flange therebetween with the other end of said bolt projecting towards said cylindrical member, an elongated substantially hollow cylindrical sleeve loosely mounted on the other end of said bolt, and a wing nut threaded on said bolt intermediate the inner end of said sleeve and the nut adjacent thereto, said wing nut being rotatable to force the outer end of said sleeve against said cylindrical member to releasably clamp said cylindrical member between said brace and said outer end of said sleeve.

2. A bouquet holder as defined in claim 1, and an elongated substantially cylindrical receptacle having a pair of opposed open and closed ends, said cylindrical receptacle being insertable within said cylindrical member with said closed end thereof being juxtaposed with respect to and supported by said closed end of said cylindrical member.

References Cited in the file of this patent

UNITED STATES PATENTS

| | | |
|---|---|---|
| 548,508 | Bjelland | Oct. 22, 1895 |
| 759,913 | Peterson | May 17, 1904 |
| 1,541,983 | McGowan | June 16, 1925 |